(12) United States Patent
Hayakawa et al.

(10) Patent No.: US 10,679,771 B2
(45) Date of Patent: *Jun. 9, 2020

(54) COMPOSITE HARNESS, METHOD OF MANUFACTURING THE SAME, AND COMPOSITE CABLE

(71) Applicant: Hitachi Metals, Ltd., Tokyo (JP)

(72) Inventors: Yoshikazu Hayakawa, Hitachi (JP); Tomoyuki Murayama, Hitachi (JP); Hirotaka Eshima, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,055

(22) Filed: Feb. 28, 2019

(65) Prior Publication Data

US 2019/0198194 A1 Jun. 27, 2019

Related U.S. Application Data

(63) Continuation of application No. 15/407,867, filed on Jan. 17, 2017, now Pat. No. 10,283,235.

(30) Foreign Application Priority Data

Jan. 21, 2016 (JP) ................................ 2016-009759

(51) Int. Cl.
*H01B 7/02* (2006.01)
*H01B 7/36* (2006.01)
(Continued)

(52) U.S. Cl.
CPC ....... *H01B 7/0225* (2013.01); *B60R 16/0207* (2013.01); *B60R 16/0215* (2013.01);
(Continued)

(58) Field of Classification Search
CPC ............ B60R 16/0207; B60R 16/0215; H01B 7/0045; H01B 7/0208; H01B 7/0216;
(Continued)

(56) References Cited

U.S. PATENT DOCUMENTS 4,126,936 A 11/1978 Koller
8,455,080 B2 6/2013 Baer
(Continued)

FOREIGN PATENT DOCUMENTS

JP 2013-237428 11/2013
JP 2014-135153 A 7/2014

*Primary Examiner* — Levi Gannon
(74) *Attorney, Agent, or Firm* — Roberts Calderon Safran & Cole P.C.

(57) ABSTRACT

A composite harness includes a composite cable that includes a plurality of first electric wires, a multicore wire formed by covering a plurality of second electric wires having a smaller diameter than the plurality of first electric wires with one urethane-based resin inner sheath to be in contact with the first electric wires, and a jacket covering an outer periphery of the plurality of first electric wires and the multicore wire, and a molded resin provided at an end portion of the composite cable so as to cover an outer surface of the inner sheath at an end portion of the multicore wire. The outer surface of the inner sheath is irregularity-formed at least at a portion in contact with the plurality of first electric wires and a portion covered with the molded resin.

19 Claims, 3 Drawing Sheets

(51) Int. Cl.
*H01B 13/012* (2006.01)
*H01B 13/06* (2006.01)
*B60R 16/02* (2006.01)
*H01B 7/18* (2006.01)
*H01B 7/00* (2006.01)

(52) U.S. Cl.
CPC ........... *H01B 7/0045* (2013.01); *H01B 7/188* (2013.01); *H01B 7/36* (2013.01); *H01B 13/01209* (2013.01); *H01B 13/06* (2013.01); *H01B 13/01263* (2013.01)

(58) Field of Classification Search
CPC .................. H01B 7/0225; H01B 7/188; H01B 13/01209; H01B 13/01263; H01B 13/06; H01B 13/141
See application file for complete search history.

(56) References Cited

U.S. PATENT DOCUMENTS

| | | |
|---|---|---|
| 9,000,301 B2 | 4/2015 | Hayakawa et al. |
| 9,463,756 B2 | 10/2016 | Hayakawa et al. |
| 2010/0248540 A1 | 9/2010 | Eshima |
| 2012/0097419 A1 | 4/2012 | Varkey et al. |
| 2012/0312596 A1 | 12/2012 | Taniguchi et al. |
| 2013/0277087 A1 | 10/2013 | Hayakawa et al. |
| 2014/0326480 A1 | 11/2014 | Hashimoto et al. |
| 2015/0165987 A1 | 6/2015 | Hayakawa et al. |
| 2015/0165988 A1 | 6/2015 | Hayakawa et al. |
| 2015/0179307 A1 | 6/2015 | Ranganathan et al. |
| 2016/0141070 A1 | 5/2016 | Heipel et al. |
| 2016/0300641 A1 | 10/2016 | Mayama et al. |
| 2016/0339854 A1 | 11/2016 | Hayakawa et al. |

COMPOSITE HARNESS, METHOD OF MANUFACTURING THE SAME, AND COMPOSITE CABLE

The present application is a Continuation Application under 35 USC § 120 of U.S. application Ser. No. 15/407,867, filed Jan. 17, 2017, which is based on based on Japanese patent application No. 2016-009759 filed on Jan. 21, 2016, the entire contents of which are incorporated herein by reference.

BACKGROUND OF THE INVENTION

1. Field of the Invention

The invention relates to a composite harness, a method of manufacturing the composite harness and a composite cable and, in particular, to a composite harness for connecting a wheel side and a vehicle body side in a vehicle, a method of manufacturing the composite harness, and a composite cable.

2. Description of the Related Art

In recent years, electrically operated brake units are used in vehicles such as automobiles.

Electro-mechanical brakes (EMB) and electric parking brakes (EPB), etc., are known as such electrically operated brake units.

The electro-mechanical brakes, also simply called electric friction brake or electric brake, are configured such that a rotational drive force of a dedicated electric motor mounted on each wheel of a vehicle is controlled according to the operation amount (tread force or displacement amount) of a brake pedal by a driver, so that a piston driven by the electric motor presses brake pads against a disc rotor of the wheel to generate a braking force intended by the driver.

The electric parking brakes are configured such that a dedicated electric motor provided on each wheel of a vehicle is driven based on an operation performed on a parking brake activation switch by a driver after stopping a vehicle, so that a piston driven by the electric motor presses brake pads against a disc rotor of the wheel to generate a braking force.

Meanwhile, in recent years, sensors, e.g., ABS (Anti-Lock Brake System) sensor for detecting the speed of a wheel rotation during motion, air pressure sensor for detecting air pressure of a tire and temperature sensor, etc., are often mounted on wheels of vehicles.

Accordingly, the wheel side and the vehicle body side are connected through composite cables in which a signal line for a sensor mounted on a wheel or a signal line for controlling an electro-mechanical brake and a power line for supplying power to an electric motor of electro-mechanical brake or electric parking brake are housed in one sheath. The composite cables with connectors or sensor portions, etc., integrally provided at end portions are called composite harness.

JP-A-2013-237428 proposes a composite cable provided with plural power lines, a multicore wire (covered signal lines) formed by covering plural signal lines with one inner sheath, and an outer sheath covering the outer periphery of the plural power lines and the multicore wire.

In the composite cable described in JP-A-2013-237428, the plural power lines are in contact with the multicore wire. In addition, in the composite cable described in JP-A-2013-237428, the inner and outer sheath are formed of a urethane-based resin (thermoplastic urethane) which has resistance to chipping due to fly rock, etc., and is easily bent.

SUMMARY OF THE INVENTION

The composite cable described in JP-A-2013-237428, however, needs further improvement since the urethane-based resin used to form the inner sheath of the multicore wire has high adhesion (tight contact) to the power lines and the high adhesion may prevent relative movement between the multicore wire and the power lines, resulting in a decrease in flex durability of the composite cable.

On the other hand, in composite harnesses in which a connector or a sensor portion, etc., provided at an end portion of the multicore wire is integrated by a molded resin such as nylon, there is a problem that the urethane-based resin used to form the inner sheath has low adhesion (less tight contact) to the molded resin. The adhesion between the inner sheath and the molded resin is desired to be improved to prevent water from entering inside the connector or the sensor portion along the composite cable.

It is an object of the invention to provide a composite harness that allows an improvement both in flex durability of the composite cable and in adhesion between the inner sheath and a molded resin, as well as a method of manufacturing the composite harness and a composite cable.

According to an embodiment of the invention, a composite harness comprises:

a composite cable that comprises a plurality of first electric wires, a multicore wire formed by covering a plurality of second electric wires having a smaller diameter than the plurality of first electric wires with one urethane-based resin inner sheath to be in contact with the first electric wires, and a jacket covering an outer periphery of the plurality of first electric wires and the multicore wire; and a molded resin provided at an end portion of the composite cable so as to cover an outer surface of the inner sheath at an end portion of the multicore wire, wherein the outer surface of the inner sheath is irregularity-formed at least at a portion in contact with the plurality of first electric wires and a portion covered with the molded resin.

According to another embodiment of the invention, a method of manufacturing a composite harness comprising a composite cable that comprises a plurality of first electric wires, a multicore wire formed by covering a plurality of second electric wires having a smaller diameter than the plurality of first electric wires with one urethane-based resin inner sheath to be in contact with the first electric wires and a jacket covering the outer periphery of the plurality of first electric wires and the multicore wire, and a molded resin provided at an end portion of the composite cable so as to cover the outer surface of the inner sheath at an end portion of the multicore wire, the method comprises:

irregularity-forming the outer surface of the inner sheath at least at a portion in contact with the plurality of first electric wires and a portion covered with the molded resin; and forming the molded resin so as to cover the irregularity-formed portion of the inner sheath.

According to another embodiment of the invention, a composite cable comprises:

a plurality of first electric wires;

a multicore wire formed by covering a plurality of second electric wires having a smaller diameter than the plurality of first electric wires with one urethane-based resin inner sheath to be in contact with the first electric wires; and a jacket covering the outer periphery of the plurality of first electric wires and the multicore wire, wherein the outer surface of the inner sheath is irregularity-formed at least at a portion in contact with the plurality of first electric wires and an end portion of the multicore wire.

Effects of the Invention

According to an embodiment of the invention, a composite harness can be provided that allows an improvement both in flex durability of the composite cable and in adhesion between the inner sheath and a molded resin, as well as a method of manufacturing the composite harness and a composite cable.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

An embodiment of the invention will be described below in conjunction with the appended drawings.

Description of a Vehicle in which the Composite Harness is Used

Figure 1:
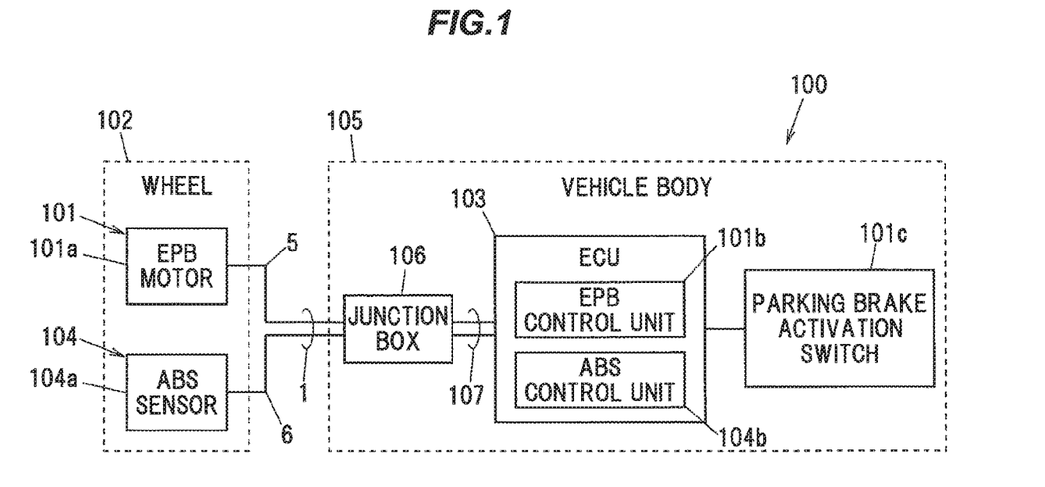
FIG. 1 is a block diagram illustrating a configuration of a vehicle in which a composite harness in an embodiment of the present invention is used.

FIG. 1 is a block diagram illustrating a configuration of a vehicle in which a composite harness in the present embodiment is used.

As shown in FIG. 1, a vehicle 100 is provided with an electric parking brake (hereinafter, referred to as "EPB") 101 as an electrically operated brake unit.

The EPB 101 is provided with an EPB motor 101a and an EPB control unit 101b.

The EPB motor 101a is mounted on a wheel 102 of the vehicle 100. The EPB control unit 101b is mounted on an ECU (electronic control unit) 103 of the vehicle 100. Alternatively, the control unit 101b may be mounted on a control unit other than the ECU 103, or may be mounted on a dedicated hardware unit.

The EPB motor 101a is provided with a piston to which brake pads are attached though it is not illustrated, the piston moved by rotary drive of the EPB motor 101a presses the brake pads against a disc rotor of a wheel (the wheel 102) to generate a braking force. A pair of first electric wires 5 as power lines is connected to the EPB motor 101a to supply a drive current to the EPB motor 101a.

The EPB control unit 101b is configured to output a drive current to the EPB motor 101a for a predetermined period of time (e.g., for 1 second) when a parking brake activation switch 101c is turned from an OFF state to an ON state during the stationary state of the vehicle 100, so that the brake pads are pressed against the disc rotor of the wheel 102 and a braking force to be applied to the wheel 102 is generated. The EPB control unit 101b is also configured to output a drive current to the EPB motor 101a when the parking brake activation switch 101c is turned from the ON state to the OFF state or when an accelerator pedal is depressed, so that the brake pads move away from the disc rotor of the wheel and the braking force on the wheel 102 is released. In other words, an operating state of the EPB 101 is maintained from when the parking brake activation switch 101c is turned on to when the parking brake activation switch 101c is turned off or to when the accelerator pedal is depressed. The parking brake activation switch 101c may be a switch of either a lever-type or pedal-type.

An ABS device 104 is also mounted on the vehicle 100. The ABS device 104 is provided with an ABS sensor 104a and an ABS control unit 104b.

The ABS sensor 104a is mounted on the wheel 102 to detect a rotation speed of the wheel 102 during motion of the vehicle. The ABS control unit 104b is mounted on the ECU 103 to control a brake unit based on an output of the ABS sensor 104a to adjust a braking force applied to the wheel 102 so that the wheel 102 is not locked when suddenly stopped. A pair of second electric wires 6 as signal lines is connected to the ABS sensor 104a.

A composite cable 1 in the present embodiment is obtained by covering the first electric wires 5 and the second electric wires 6 with one jacket 4 (see FIGS. 2A and 2B), and a composite harness 20 in the present embodiment is obtained by attaching end members such as connector to the composite cable 1. The composite cable 1 extending out of the wheel 102 side is connected to a wire group 107 inside a junction box 106 provided on a vehicle body 105 and is then connected to the ECU 103 and a battery (not shown) via the wire group 107.

Although only one wheel 102 is shown in FIG. 1 to simplify the drawing, the EPB motor 101a and the ABS sensor 104a may be mounted on each of the wheels 102 of the vehicle 100, or may be mounted on, e.g., only front wheels or only rear wheels of the vehicle 100.

Description of the Composite Harness 20 and the Composite Cable 1

Figure 2A:
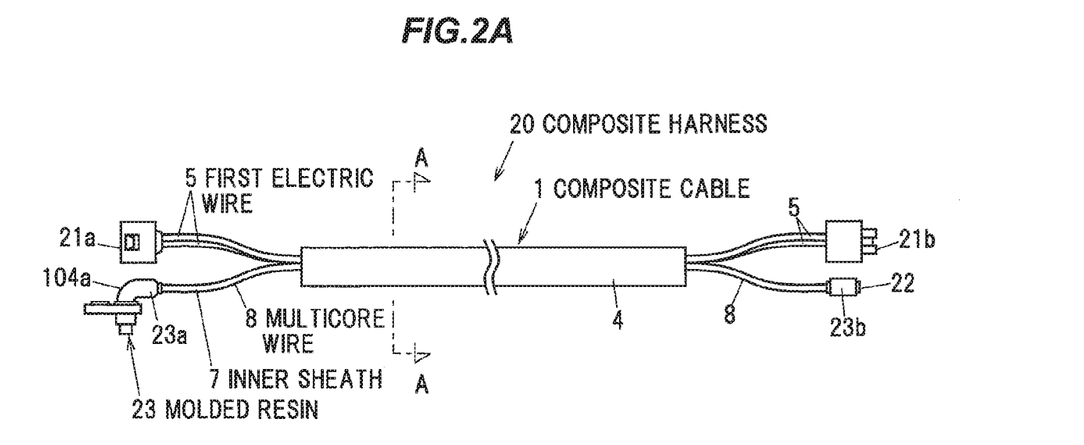
FIG. 2A is a schematic structural diagram illustrating the composite harness in the embodiment of the invention.
Figure 2B:
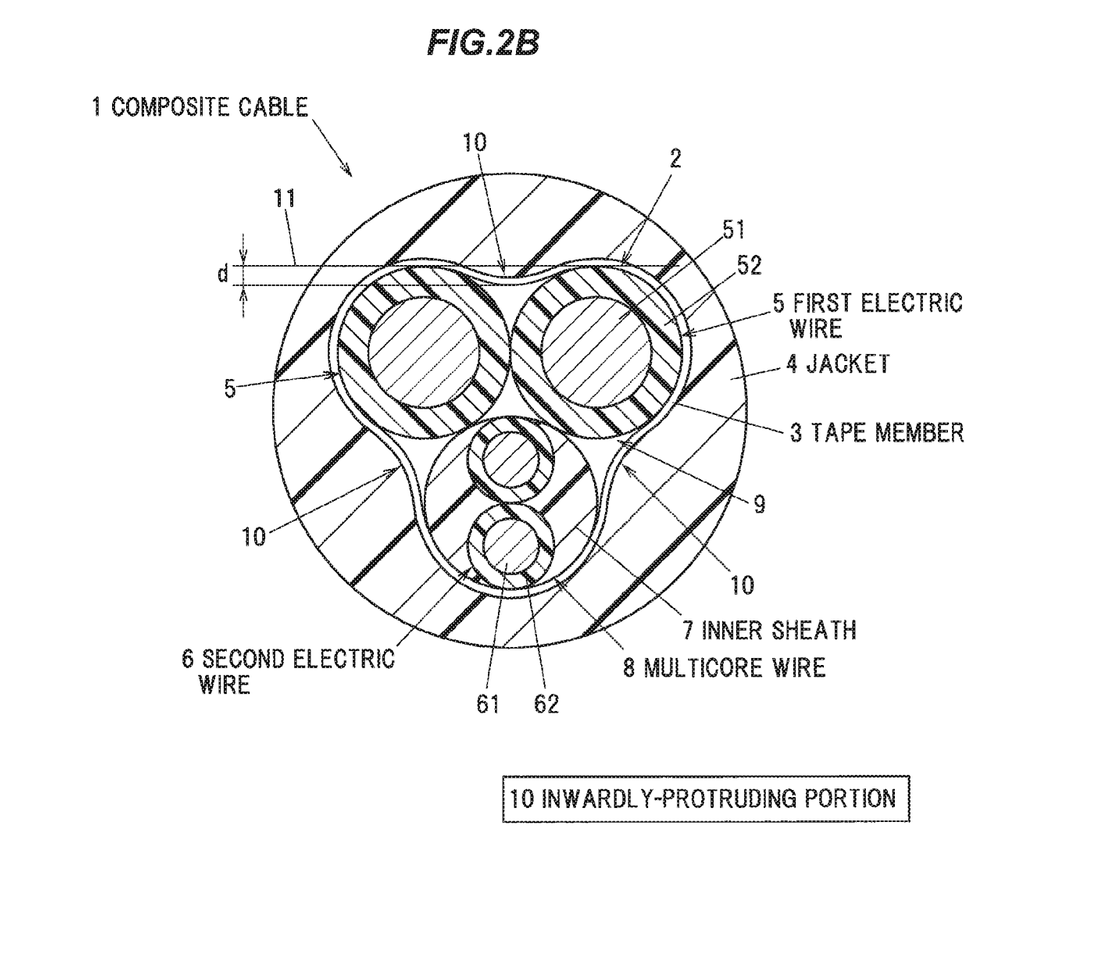
FIG. 2B is a cross sectional view taken along a line A-A in FIG. 2A.
Figure 3:
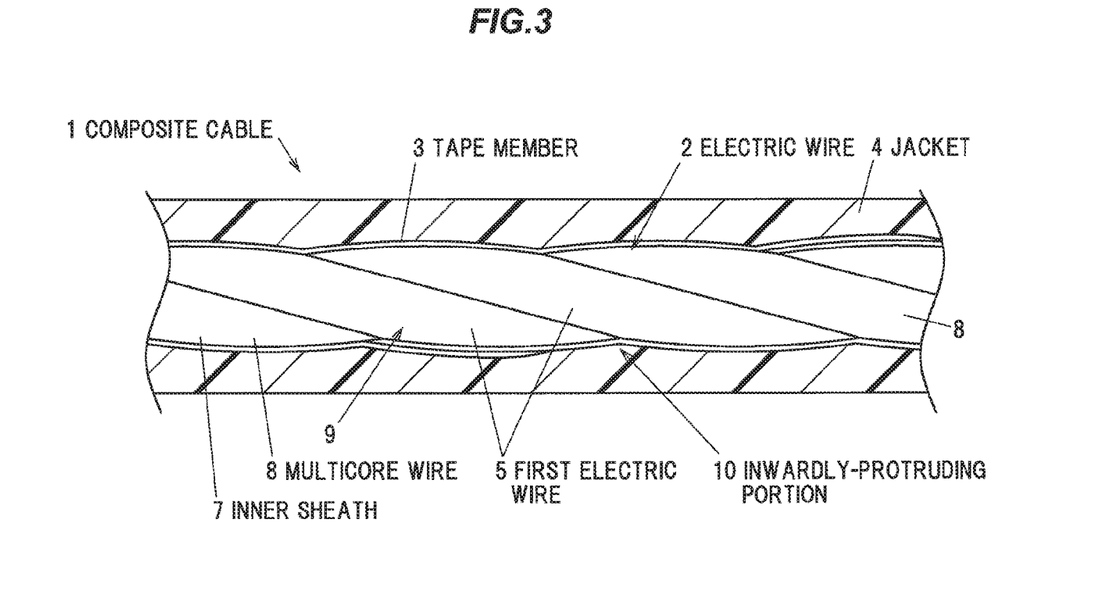
FIG. 3 is a broken sectional view of the composite cable, showing a jacket and a tape member on a cross section.

FIG. 2A is a schematic structural diagram illustrating the composite harness in the present embodiment and FIG. 2B is a cross sectional view taken along the line A-A in FIG. 2A. FIG. 3 is a broken sectional view of the composite cable 1, showing a jacket and a tape member on a cross section.

As shown in FIGS. 2A to 3, the composite harness 20 is composed of the composite cable 1 and end members such as connector attached to end portions of the composite cable 1.

The composite cable 1 is provided with plural first electric wires 5, a multicore wire 8 in which plural second electric wires 6 having a smaller diameter than the plural first electric wires 5 are covered with one inner sheath 7, and the jacket (outer sheath) 4 covering the outer periphery of the plural first electric wires 5 and the multicore wire 8.

In the present embodiment, the first electric wire 5 is constructed using a power line for supplying a drive current to the motor 101a for the EPB 101 mounted on the wheel 102 of the vehicle 100.

Meanwhile, in the present embodiment, the second electric wire 6 is constructed using a signal line for the ABS sensor 104a mounted on the wheel 102 of the vehicle 100.

Although the composite cable 1 in the present embodiment has three electric wires 2 in total (two first electric wires 5 and one multicore wire 8), the number of the electric wires 2 is not limited thereto.

Strands having a diameter of not less than 0.05 mm and not more than 0.30 mm can be used to form a first conductor 51. When using strands having a diameter of less than 0.05 mm, sufficient mechanical strength may not be obtained, causing a decrease in flex resistance. When using strands having a diameter of more than 0.30 mm, flexibility of the composite cable 1 may decrease.

The outer diameter of the first conductor 51 and the thickness of a first insulation 52 of the first electric wire 5 are appropriately adjusted according to magnitude of required drive current. In the present embodiment, considering that the first electric wire 5 is a power line for supplying a drive current to the motor 101*a* for the EPB 101, the outer diameter of the first conductor 51 is set to not less than 1.5 mm and not more than 3.0 mm and the outer diameter of the first electric wire 5 is set to not less than 2.0 mm and not more than 4.0 mm.

The second electric wire 6 is an insulated wire in which a second conductor 61 formed by twisting highly conductive strands of copper, etc., is covered with a second insulation 62 formed of an insulating resin such as cross-linked polyethylene. Strands having a diameter of not less than 0.05 mm and not more than 0.30 mm can be used to form the second conductor 61, in the same manner as the first conductor 51.

The plural second electric wires 6 in a twisted state are covered with one inner sheath 7. The multicore wire 8 is formed by covering the plural second electric wires 6 with one inner sheath 7. Although the multicore (two-core) wire 8 formed by covering a pair (two) of second electric wires 6 with one inner sheath 7 will be described in the present embodiment, the number of cores in the multicore wire 8 is not limited thereto. Also, the composite cable 1 may have plural multicore wires 8.

The outer diameter of the second electric wire 6 is smaller than that of the first electric wire 5. In the present embodiment, a pair of first electric wires 5 and the multicore wire 8 formed by covering two second electric wires 6 with one inner sheath 7 are twisted together. Therefore, from the viewpoint of making the outer diameter of the composite cable 1 close to a circular shape, it is desirable to use the second electric wire 6 which is about half the outer diameter of the first electric wire 5. In detail, it is possible to use the second electric wire 6 which has an outer diameter of not less than 1.0 mm and not more than 1.8 mm and is formed using the second conductor 61 having an outer diameter of not less than 0.4 mm and not more than 1.0 mm.

In the composite cable 1, two first electric wires 5 and one multicore wire 8 are twisted together and form an assembled article 9. The two first electric wires 5 and the one multicore wire 8 are twisted in contact with each other, such that the inner sheath 7 of the multicore wire 8 is in contact with the first electric wires 5 (the first insulations 52). When, for example, many electric wires 2 are provided, the cable may have a multi-layer twisted structure in which an inner layer portion is formed by twisting plural electric wires 2 and an outer layer portion is formed by spirally winding other electric wires 2 around the inner layer portion.

In the EPB 101, a drive current is supplied to the motor 101*a* basically when the vehicle is stationary. On the other hand, the ABS sensor 104*a* is used when the vehicle is in motion, and the ABS sensor 104*a* is not used during when the drive current is supplied through the first electric wires 5. Therefore, in the present embodiment, a shield conductor around the multicore wire 8 is omitted. Omitting the shield conductor allows the composite cable 1 to have a smaller diameter than when providing the shield conductor and also reduces the number of components, thereby reducing the cost.

Meanwhile, although the first electric wire 5 for supplying a drive current to the EPB motor 101*a* is described here, the first electric wire 5 may be used to supply a drive current to, e.g., an electric motor of an electro-mechanical brake (hereinafter, referred as EMB) provided on the wheel 102. In this case, since electric current flows through the first electric wires 5 also during motion of the vehicle 100, it is desirable to provide a shield conductor around the multicore wire 8 to prevent malfunction of the ABS device 104 due to noise.

Furthermore, although the second electric wire 6 as a signal line for the ABS sensor 104*a* is described here, the second electric wire 6 may be a signal line used for another sensor provided on the wheel 102, e.g., for a temperature sensor or an air pressure sensor for detecting air pressure of a tire, etc., or may be a damper wire used to control a damping device of the vehicle 100, or moreover, may be a signal line for controlling the EMB (e.g., a CAN cable, etc.). Even when the first electric wire 5 is used to supply a drive current to the EPB motor 101*a*, it is desirable to provide a shield conductor around the multicore wire 8 in case of using the second electric wires 6 during the stationary state of the vehicle 100 to prevent malfunction due to noise.

The outer diameter of the assembled article 9 formed by twisting three electric wires 2 (two first electric wires 5 and one multicore wire 8) together is, e.g., about 5 mm to 9 mm. A twist pitch of the electric wires 2 in the assembled article 9 is set by taking into account the outer diameter of the assembled article 9 so that an unnecessary load is not applied to the electric wires 2. The twist pitch of the electric wires 2 in the assembled article 9 here is about 50 mm, but the twist pitch of the electric wires 2 is not limited thereto. The twist pitch of the electric wires 2 is a distance along a longitudinal direction of the assembled article 9 at which a given electric wire 2 (the first electric wire 5 or the multicore wire 8) is located at the same position in a circumferential direction of the assembled article 9.

In the present embodiment, the inner sheath 7 of the multicore wire 8 and the jacket 4 are formed of a urethane-based resin (thermoplastic urethane). The urethane-based resin has resistance to chipping due to fly rock, etc., is easily bent, and is thus suitable as the inner sheath 7 and the jacket 4 of the composite cable 1 which is used to connect the wheel 102 to the vehicle body 105 in the vehicle 100 and is bent repeatedly. Alternatively, cross-linked thermoplastic urethane may be used to form the inner sheath 7 and the jacket 4.

In the composite harness 20, a wheel-side power connector 21*a* for connection to the EPB motor 101*a* is attached to one end of the pair of first electric wires 5, and a vehicle body-side power connector 21*b* for connection to the wire group 107 inside the junction box 106 is attached to the other end of the pair of first electric wires 5.

The ABS sensor 104*a* is attached to one end of the multicore wire 8 (the pair of second electric wires 6), and a vehicle body-side ABS connector 22 for connection to the wire group 107 inside the junction box 106 is attached to the other end of the multicore wire 8 (the pair of second electric wires 6). In the ABS sensor 104*a*, a molded resin 23*a* is provided so as to cover a sensor portion (sensor head, not shown) as well as an end portion of the multicore wire 8 and the sensor portion is thereby integrated with the multicore wire 8. Meanwhile, in the vehicle body-side ABS connector 22, a molded resin 23*b* is provided so as to cover a terminal area (not shown) as well as the other end portion of the multicore wire 8 and the terminal area is thereby integrated with the multicore wire 8.

As such, the composite harness 20 has molded resins 23 (23a and 23b) which are provided at the end portions of the composite cable 1 and cover the end portions of the multicore wire 8. The molded resins 23 are provided so as to cover the outer surface of the inner sheath 7 at the end portions of the multicore wire 8. The molded resins 23 are formed of, e.g., nylon.

The urethane-based resin used to form the inner sheath 7 when having a small surface roughness is likely to stick to peripheral members. Therefore, the inner sheath 7 may stick to the outer surfaces of the first electric wires 5, which prevents relative movement between the first electric wires 5 and the multicore wire 8 and causes an excessive load to be applied to the first electric wires 5 and the multicore wire 8 when the composite cable 1 is bent.

Meanwhile, when the molded resins 23 are provided, the urethane-based resin used to form the inner sheath 7 is less likely to be in tightly contact with the molded resins 23. If the inner sheath 7 is not in tightly contact with the molded resins 23, water may penetrate into the molded resins 23 and cause troubles such as failure of the ABS sensor 104a or the vehicle body-side ABS connector 22.

Based on this fact, the composite harness 20 in the present embodiment is configured such that the outer surface of the inner sheath 7 is finely irregularity-formed (embossed) at least at a portion in contact with the plural first electric wires 5 and end portions of the multicore wire 8 which are to be covered with the molded resins. In the present embodiment, the entire outer surface of the inner sheath 7 is finely irregularity-formed in view of the ease of processing.

Since the surface irregularity-forming reduces surface stickiness of the inner sheath 7, the first electric wires 5 and the multicore wire 8 can relatively move easily and flex durability is thereby improved. In addition, since minute protrusions are melted by heat during formation of the molded resins 23, adhesion (tight contact) between the inner sheath 7 and the molded resins 23 is improved and it is thus possible to prevent water from penetrating into the molded resins 23.

The arithmetic mean surface roughness Ra of the irregularity-formed outer surface of the inner sheath 7 is desirably not less than 1 μm and not more than 30 μm. This is because when the arithmetic mean surface roughness Ra of the outer surface of the inner sheath 7 is less than 1 μm, the outer surface of the inner sheath 7 is glossy and the surface may become sticky. In addition, when the arithmetic mean surface roughness Ra of the outer surface of the inner sheath 7 is less than 1 μm, the inner sheath 7 may not sufficiently adhere to (tightly in contact with) the molded resins 23. The arithmetic mean surface roughness Ra here is obtained by a parameter calculation formula according to JIS B0601 (2013).

In view of preventing surface stickiness, the arithmetic mean surface roughness Ra of the outer surface of the inner sheath 7 is more preferably not less than 4 μm. Meanwhile, when the arithmetic mean surface roughness Ra of the outer surface of the inner sheath 7 is too large, mechanical characteristics of the inner sheath 7 may decrease and also the outer appearance is obviously poorer. Therefore, the arithmetic mean surface roughness Ra of the outer surface of the inner sheath 7 is more preferably not more than 15 μm. In other words, the arithmetic mean surface roughness Ra of the outer surface of the inner sheath 7 is preferably not less than 4 μm and not more than 15 μm.

The inner sheath 7 is formed by extrusion molding using an extruder. The surface roughness of the outer surface of the inner sheath 7 can be controlled by changing the extrusion molding conditions, i.e., the set temperature and the line speed (flow rate of resin) during the extrusion molding. The inner sheath 7 can have a larger surface roughness when, for example, viscosity of the resin is increased by lowering the set temperature. The inner sheath 7 can have a larger surface roughness also when shear stress acting on the resin is increased by increasing the line speed. The set temperature and the line speed during the extrusion molding can be appropriately determined depending on the size, etc., of the extruder, and the extrusion molding conditions are adjusted so that the outer surface of the inner sheath 7 has an arithmetic mean surface roughness Ra of not less than 1 μm (more preferably not less than 4 μm and not more than 15 μm).

Meanwhile, if the jacket 4 is directly provided on the assembled article 9, relative movement between the jacket 4 and the assembled article 9 (the first electric wires 5, the multicore wire 8) possibly becomes difficult due to surface stickiness of the urethane-based resin used as the jacket 4 and flex durability thus decreases. A lubricant such as talc powder could be applied between the jacket 4 and the assembled article 9 (around the plural electric wires 2) but this causes a problem that the lubricant is scattered around during work such as cable termination, causing a decrease in workability.

For this reason, in the present embodiment, a tape member 3 is spirally wound around the assembled article 9 which is formed by twisting the plural first electric wires 5 and the multicore wire 8 together, and the jacket 4 formed of a urethane-based resin is then applied to cover the tape member 3. The tape member 3 is interposed between the assembled article 9 and the jacket 4 and serves to reduce friction between the electric wires 2 (the first electric wires 5 and the multicore wire 8) and the jacket 4 when being bent and to make the electric wires 2 separate easily from the jacket 4 at the time of termination. As such, providing the tape member 3 can reduce friction between the electric wires 2 and the jacket 4 without using a lubricant such as talc powder and reduces stress applied to the electric wires 2 when being bent, and it is thereby possible to improve flex durability as well as workability at the time of termination.

The tape member 3 is desirably slidable (desirably has a low friction coefficient) with respect to the first insulation 52 of the first electric wire 5 and the inner sheath 7, and can be formed of, e.g., a non-woven fabric, a paper or a resin (a resin film, etc.). In more detail, a material of the tape member 3 is selected so that the friction coefficient (coefficient of static friction) between the tape member 3 and the first insulation 52/the inner sheath 7 is lower than the friction coefficient (coefficient of static friction) between the jacket 4 and the first insulation 52/the inner sheath 7 without the tape member 3.

It is also possible to use the tape member 3 having a laminated structure composed of not less than two layers. In this case, the tape member 3 is configured so that a surface to be in contact with the assembled article 9 is formed of any one of a non-woven fabric, a paper or a resin layer. For example, it can be configured such that the tape member 3 is formed by providing a resin layer on one side of a paper and is wound with the resin layer having a lower friction coefficient on the assembled article 9 side.

The tape member 3 used in the present embodiment is formed of a polyester-based non-woven fabric having a thickness of 0.07 mm. The thickness of the non-woven fabric used as the tape member 3 is desirably not less than 0.03 mm and not more than 0.10 mm. This is because when the thickness of the non-woven fabric is less than 0.03 mm, a portion of the jacket 4 may penetrate through the tape member 3 and reach the electric wires 2 during when applying the jacket 4, causing a decrease in workability at the time of termination. On the other hand, when the thickness of the non-woven fabric is more than 0.10 mm, the rigidity of the tape member 3 is increased and this may cause a decrease in flexibility of the composite cable 1.

The tape member 3 is spirally wound around the assembled article 9 so as to overlap at a portion in a width direction (a direction perpendicular to the longitudinal direction and thickness direction of the tape member 3). The overlap width of the tape member 3 is, e.g., not less than ¼ and not more than ½ of the width of the tape member 3.

The width of the tape member 3 is determined so that creases are not formed on the tape member 3 when the tape member 3 is wound, and it is desirable that the width of the used tape member 3 be decreased with a decrease in the outer diameter of the entire assembled article 9. In detail, when the outer diameter of the entire assembled article 9 is 5 mm to 9 mm, the width of the tape member 3 is about 20 mm to 50 mm.

A winding pitch of the tape member 3, i.e., a distance along a longitudinal direction at which the tape member 3 is located at the same circumferential position (e.g., a distance between the widthwise edges), can be adjusted by changing the width of the tape member 3 and the overlap width thereof. However, if the width of the tape member 3 is increased and the winding pitch is also increased, the tape member 3 becomes close to the longitudinally wrapped state, resulting in that the composite cable 1 has less flexibility and is less likely to be bent. Therefore, the winding pitch of the tape member 3 is desirably not more than 50 mm.

Although a shield conductor is omitted in the present embodiment since the first electric wires 5 are used to supply a drive current to the EPB motor 101a and the drive current flows through the first electric wires 5 in a relatively short time, a shield conductor may be provided between the tape member 3 and the jacket 4 or around the jacket 4 depending on the intended use, etc., of the first electric wires 5.

Meanwhile, in the composite cable 1 of the present embodiment, the tape member 3 and the jacket 4 have inwardly-protruding portions 10 each of which protrudes inward beyond a common tangent line for two outermost circumferentially-adjacent electric wires 2 (a common tangent line for two adjacent first electric wires 5 or for one first electric wire 5 and the multicore wire 8) and gets into a gap formed between the two adjacent electric wires 2, and the inwardly-protruding portions 10 are spirally formed along a cable longitudinal direction. In FIG. 2B, the common tangent line for two first electric wires 5 is indicated by a reference numeral 11. Regarding the common tangent line for two adjacent electric wires 2 in case that not less than three electric wires 2 are used, there are such tangents on the inner and outer sides of the composite cable 1. The term "common tangent line" here is a tangent line which is located on the outer side of the composite cable 1 and is perpendicular to the cable longitudinal direction.

In other words, in the present embodiment, the tape member 3 and the jacket 4 get into each triangle boundary area formed outward between two adjacent electric wires 2. In the composite cable 1, the electric wire 2 is in contact with the tape member 3 and the tape member 3 in contact with the jacket 4 at each triangle boundary area formed between one electric wire 2 and another electric wire 2.

As a result, hollow portions formed around the electric wires 2 are reduced in size and buckling is less likely to occur even when the composite cable 1 is bent or twisted. In addition, since the tape member 3 gets in the triangle boundary areas between the electric wires 2 and is restricted from moving radially outward by the jacket 4, the tape member 3 is less likely to move in the cable longitudinal direction. In other words, the tape member 3 is sandwiched between the jacket 4 and the electric wires 2 at each triangle boundary area between one electric wire 2 and another electric wire 2, and relative movement of the tape member 3 in the cable longitudinal direction is thereby prevented.

If the inwardly-protruding length of the inwardly-protruding portion 10 is small, a buckling prevention effect and an effect of preventing the movement of the tape member 3 may not be sufficiently obtained. Therefore, the inwardly-protruding length of the inwardly-protruding portion 10, i.e., a distance d between the common tangent line for the adjacent electric wires 2 and a top portion of the inwardly-protruding portion 10 is desirably not less than 3%, preferably not less than 10% of the outer diameter of the thickest electric wire 2 (the first electric wire 5 in this example) among the plural electric wires 2.

When the outer diameter of the first electric wire 5 is, e.g., 3 mm, the distance d is desirably at least not less than 0.1 mm. To obtain an effect from having the inwardly-protruding portions 10, the distance d is desirably at least not less than 0.1 mm, preferably not less than 0.3 mm although it depends on the outer diameter of the electric wires 2 to be used. The distance d does not need to be the fixed distance and has some tolerance.

Meanwhile, when the protruding length of the inwardly-protruding portion 10 is too large, workability at the time of termination (e.g., stripping work to remove the jacket 4) may decrease. Therefore, the distance d is desirably not more than 40%, preferably not more than 35% of the outer diameter of the thickest electric wire 2 (the first electric wire 5 in this example) among the plural electric wires 2. The distance d is desirably not more than 1 mm in view of easy removal of the jacket 4 although it depends on the outer diameter of the electric wires 2 to be used.

When the twist direction of the plural electric wires 2 is different from the winding direction of the tape member 3, the tape member 3 is less likely to get in the triangle boundary area between the adjacent electric wires 2. Therefore, the twist direction of the plural electric wires 2 is desirably the same direction as the winding direction of the tape member 3. In this case, when the tape member 3 is wound around the assembled article 9 while applying an appropriate tensile force, the tape member 3 can easily get into the triangle boundary area between the adjacent electric wires 2. After the jacket 4 is applied around the tape member 3 by extrusion coating, the inwardly-protruding portions 10 are formed.

The twist direction of the electric wires 2 here is a direction that the electric wires 2 rotate from the base end toward the front end when the composite cable 1 is viewed from the front end side (on the side where the tape member 3 overlaps upon itself). Meanwhile, the winding direction of the tape member 3 is a direction that the tape member 3 rotates from the base end toward the front end when the composite cable 1 is viewed from the front end side (on the side where the tape member 3 overlaps upon itself).

Since the twist direction of the electric wires 2 and the winding direction of the tape member 3 are the same direction, the twist of the electric wires 2 spontaneously unravels by unwinding the tape member 3 when terminating the cable and it is easy to unravel the electric wires 2. This improves disassemblability of the composite cable 1 and thereby improves cable termination workability.

In addition, since the twist direction of the electric wires 2 and the winding direction of the tape member 3 are the same direction, the electric wires 2 and the tape member 3 are loosened or tightened synchronously when the composite cable 1 is distorted. This disperses a load caused by distortion and prevents an excess load from being applied to a certain portion of the composite cable 1, thereby improving distortion resistance.

When the twist pitch of the electric wires 2 is reduced, the composite cable 1 becomes more flexible and is easily bent but distortion resistance decreases due to the reduced looseness of the twist. On the other hand, when the twist pitch of the electric wires 2 is increased, distortion resistance is improved but flexibility decreases. In the present embodiment, since a load is dispersed by synchronously loosening or tightening the electric wires 2 and the tape member 3 when being distorted, it is possible to provide enough distortion resistance even when the twist pitch of the electric wires 2 is reduced to improve flexibility.

The twist pitch of the plural electric wires 2 is desirably the same as the winding pitch of the tape member 3 so that the tape member 3 can get into the triangle boundary area between the adjacent electric wires 2 more easily. However, the twist pitch of the plural electric wires 2 may be slightly different from the winding pitch of the tape member 3, and in such a case, the winding pitch of the tape member 3 is desirably within ±10% of the twist pitch of the plural electric wires 2.

The inwardly-protruding portions 10 are desirably formed throughout the longitudinal direction of the composite cable 1 but may be have some gaps in the middle. In other words, in the cable 1, the inwardly-protruding portions 10 may not be formed at some portions in the longitudinal direction. For example, to improve workability at the time of termination, the cable 1 may be configured such that the inwardly-protruding portions 10 are not formed (or the protruding length of the inwardly-protruding portions 10 (the distance d) is reduced) at the end portions (with a predetermined distance from the end) by, e.g., changing the winding pitch of the tape member 3.

Although the inwardly-protruding portion 10 is formed in each of the gaps (the triangle boundary areas) between three electric wires 2 in the present embodiment, it is not limited thereto. The inwardly-protruding portion 10 needs to be formed at least one of the gaps (the triangle boundary areas) between the electric wires 2.

In addition, although both the tape member 3 and the jacket 4 protrude inward beyond the common tangent line 11 in the present embodiment, it is not limited thereto. When using, e.g., a relatively thick tape member 3, only the tape member 3 may protrude inward beyond the common tangent line 11.

When manufacturing the composite harness 20, firstly, the inner sheath 7 is extruded on the pair of second electric wires 6 to form the multicore wire 8. When applying the inner sheath 7, the extrusion molding conditions such as the set temperature and the line speed, etc., are appropriately adjusted so that the entire outer surface of the inner sheath 7 is irregularity-formed throughout the cable longitudinal direction. The outer surface of the inner sheath 7 does not need to be entirely irregularity-formed but needs to be irregularity-formed at least at a portion in contact with the both first electric wires 5 and end portions covered with the molded resins 23.

After that, the assembled article 9 is formed by twisting the multicore wire 8 and the pair of first electric wires 5 together, the tape member 3 is spirally wound around the assembled article 9 and the jacket 4 is then extruded to cover the tape member 3, thereby obtaining the composite cable 1. When spirally winding the tape member 3 around the assembled article 9, an appropriate tensile force is applied so that the tape member 3 gets into the triangle boundary areas between the electric wires 2.

After that, the first electric wires 5 and the multicore wire 8 are exposed at both ends of the obtained composite cable 1 by removing the jacket 4. Then, the wheel-side power connector 21*a* and the vehicle body-side power connector 21*b* are respectively attached to the both exposed ends of the first electric wires 5, and the ABS sensor 104*a* and the vehicle body-side ABS connector 22 are respectively attached to the both exposed ends of the multicore wire 8. When attaching the ABS sensor 104*a* and the vehicle body-side ABS connector 22, the molded resins 23 (23*a* and 23*b*) are formed to cover the irregularity-formed end portions of the inner sheath 7 to ensure adhesion (tight contact) between the inner sheath 7 and the molded resins 23. The composite harness 20 is thereby obtained.

Functions and Effects of the Embodiment

In the composite harness 20 of the present embodiment, the outer surface of the inner sheath 7 is irregularity-formed at least at a portion in contact with the plural first electric wires 5 and a portion covered with the molded resins 23, as described above.

In such a configuration, surface stickiness of the inner sheath 7 formed of an urethane-based resin is reduced and the first electric wires 5 thus can easily move relative to the multicore wire 8. Therefore, it is possible to prevent an excessive load from being applied to the first electric wires 5 and the multicore wire 8 when the composite cable 1 is bent, and flex durability is thereby improved. In addition, since minute protrusions are melted by heat during formation of the molded resins 23, adhesion (tight contact) between the inner sheath 7 and the molded resins 23 is improved and it is thus possible to prevent water from penetrating into the molded resins 23.

In addition, in the composite harness 20 of the present embodiment, the tape member 3 and the jacket 4 have the inwardly-protruding portions 10 which are spirally formed along the cable longitudinal direction so as to protrude inward beyond the common tangent line 11 for two outermost circumferentially-adjacent electric wires 2 and to get into each triangle boundary area formed between the two adjacent electric wires 2.

Due to the inwardly-protruding portions 10 which get into the triangle boundary areas between the electric wires 2, hollow portions formed around the electric wires 2 can be smaller than when not providing the inwardly-protruding portions 10 and buckling of the composite cable 1 can be prevented even when the composite cable 1 is bent or distorted.

In addition, since the inwardly-protruding portions 10 restrict movement of the tape member 3, it is possible to prevent the tape member 3 from moving in the cable longitudinal direction and thus possible to prevent such troubles that the tape member 3 overlaps itself at some portions of the composite cable 1 and causes a decrease in flexibility.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A composite harness (20), comprising: a composite cable (1) that comprises a plurality of first electric wires (5), a multicore wire (8) formed by covering a plurality of second electric wires (6) having a smaller diameter than the plurality of first electric wires (5) with one urethane-based resin inner sheath (7) to be in contact with the first electric wires (5), and a jacket (4) covering the outer periphery of the plurality of first electric wires (5) and the multicore wire (8); and a molded resin (23) provided at an end portion of the composite cable (1) so as to cover the outer surface of the inner sheath (7) at an end portion of the multicore wire (8), wherein the outer surface of the inner sheath (7) is irregularity-formed at least at a portion in contact with the plurality of first electric wires (5) and a portion covered with the molded resin (23).

[2] The composite harness (20) defined by [1], wherein the entire outer surface of the inner sheath (7) is irregularity-formed.

[3] The composite harness (20) defined by [1] or [2], wherein the irregularity-formed outer surface of the inner sheath (7) has an arithmetic mean surface roughness Ra of not less than 1 μm.

[4] The composite harness (20) defined by any one of [1] to [3], wherein the composite cable (1) comprises a tape member (3) spirally wound around an assembled article (9) that is formed by twisting the plurality of first electric wires (5) and the multicore wire (8), and the jacket (4) comprising a urethane-based resin is provided to cover the periphery of the tape member (3).

[5] The composite harness (20) defined by [4], wherein the tape member (3) and the jacket (4) comprise inwardly-protruding portions (10) spirally formed along a cable longitudinal direction so as to protrude inward beyond a common tangent line for two outermost circumferentially-adjacent first electric wires (5) or a common tangent line for the first electric wire (5) and the multicore wire (8), and so as to get into a triangle boundary area formed between the two adjacent first electric wires (5) or between the first electric wire (5) and the multicore wire (8).

[6] The composite harness (20) defined by any one of [1] to [5], wherein the first electric wire (5) comprises a power line for supplying a drive current to a motor (101a) for an electric parking brake (101) mounted on a wheel (102) of a vehicle (100).

[7] The composite harness (20) defined by any one of [1] to [6], wherein the second electric wire (6) comprises a signal line for a sensor mounted on a wheel (102) of a vehicle (100).

[8] A method of manufacturing a composite harness (20) comprising a composite cable (1) that comprises a plurality of first electric wires (5), a multicore wire (8) formed by covering a plurality of second electric wires (6) having a smaller diameter than the plurality of first electric wires (5) with one urethane-based resin inner sheath (7) to be in contact with the first electric wires (5), and a jacket (4) covering the outer periphery of the plurality of first electric wires (5) and the multicore wire (8), and a molded resin (23) provided at an end portion of the composite cable (1) so as to cover the outer surface of the inner sheath (7) at an end portion of the multicore wire (8), the method comprising: irregularity-forming the outer surface of the inner sheath (7) at least at a portion in contact with the plurality of first electric wires (5) and a portion covered with the molded resin (23); and forming the molded resin (23) so as to cover the irregularity-formed portion of the inner sheath (7).

[9] A composite cable (1), comprising: a plurality of first electric wires (5); a multicore wire (8) formed by covering a plurality of second electric wires (6) having a smaller diameter than the plurality of first electric wires (5) with one urethane-based resin inner sheath (7) to be in contact with the first electric wires (5); and a jacket (4) covering the outer periphery of the plurality of first electric wires (5) and the multicore wire (8), wherein the outer surface of the inner sheath (7) is irregularity-formed at least at a portion in contact with the plurality of first electric wires (5) and an end portion of the multicore wire (8).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

For example, although the first electric wire 5 is a power line in the embodiment, the first electric wire 5 does not need to be a power line and may be a signal line.

In addition, the jacket 4 has one layer in the embodiment but may have two or more layers. When providing the jacket 4 having two or more layers by performing extrusion coating for several times, the cross sectional shape of the composite cable 1 can be more circular and the outer appearance is thereby improved.

In addition, although the composite harness 20 in the embodiment is used to connect the wheel 102 to the vehicle body 105 in the vehicle 100, the intended use of the composite harness 20 is not limited thereto and the composite harness 20 may be used in another application other than vehicle.

In addition, although the tape member 3 is spirally wound around the twisted electric wires 2 in the embodiment, the electric wires 2 may not be twisted and the tape member 3 may be longitudinally wrapped.

In addition, although the tape member 3 and the jacket 4 have the inwardly-protruding portions 10 in the embodiment, the inwardly-protruding portions 10 may be omitted. When the inwardly-protruding portions 10 are omitted, the cable may be configured such that the twist direction of the plural electric wires 2 is different from the winding direction of the tape member 3 so that the cross sectional shape is made closer to a circle to improve the outer appearance, and that the jacket 4 and the tape member 3 can be easily removed by a stripping device, etc.

What is claimed is:
1. A composite cable, comprising;
   a plurality of first electric wires;
   a multicore wire formed by covering a plurality of second electric wires with one urethane-based resin inner sheath to be in contact with the plurality of first electric wires; and
   a jacket covering an outer periphery of the plurality of first electric wires and the multicore wire,
   wherein the plurality of first electric wires and the multicore wire are twisted together, and wherein an arithmetic mean surface roughness Ra of an entire outer surface of the inner sheath throughout a cable longitudinal direction is not less than 1 μm and not more than 30 μm.

2. The composite cable according to claim 1, wherein the arithmetic mean surface roughness Ra of the outer surface of the inner sheath is not less than 1 μm and not more than 15 μm.

3. The composite cable according to claim 2, wherein the arithmetic mean surface roughness Ra of the outer surface of the inner sheath is not less than 4 μm and not more than 15 μm.

4. The composite cable according to claim 1, further comprising,
a tape member wound around the plurality of first electric wires and the multicore wire,
wherein the jacket is covered around the tape member.

5. The composite cable according to claim 4, wherein the tape member is formed of any one of a non-woven fabric, a paper, or a resin.

6. The composite cable according to claim 5, wherein a thickness of the non-woven fabric used as the tape member is not less than 0.03 mm and not more than 0.10 mm.

7. The composite cable according to claim 4, wherein the tape member and the jacket comprise inwardly-protruding portions spirally formed along the cable longitudinal direction so as to protrude inward beyond a common tangent line for two outermost circumferentially-adjacent first electric wires or a common tangent line for the first electric wire and the multicore wire, and so as to get into a triangle boundary area formed between the two adjacent first electric wires or between the first electric wire and the multicore wire.

8. The composite cable according to claim 7, wherein an inwardly-protruding length of the inwardly-protruding portion is not less than 3% and not more than 40% of an outer diameter of the first electric wire.

9. A composite cable according to claim 7, wherein a twist direction of the two outermost circumferentially-adjacent first electric wires, or the first electric wire and the multicore wire is the same direction as a winding direction of the tape member.

10. The composite cable according to claim 1, wherein a resin used for resin molding is nylon.

11. The composite cable according to claim 1, wherein a connector is attached to the other end of the multicore wire extended out of one end portion of the jacket.

12. The composite cable according to claim 1, wherein a first conductor of the first electric wire comprises strands each having a diameter of not less than 0.05 mm and not more than 0.30 mm.

13. The composite cable according to claim 1, wherein a first conductor of the first electric wire has an outer diameter of not less than 1.5 mm and not more than 3.0 mm, and
wherein the first electric wire has an outer diameter of not less than 2.0 mm and not more than 4.0 mm.

14. The composite cable according to claim 1, wherein a second conductor of the second electric wire forming the multicore wire comprises strands having a diameter of not less than 0.05 mm and not more than 0.30 mm.

15. The composite cable according to claim 1, wherein a second conductor of the second electric wire has an outer diameter of not less than 0.4 mm and not more than 1.0 mm, and
wherein the second electric wire has an outer diameter of not less than 1.0 mm and not more than 1.8 mm.

16. The composite cable according to claim 1, wherein the jacket is formed of one urethane-based resin.

17. A composite harness, comprising:
a composite cable that comprises a plurality of first electric wires;
a multicore wire formed by covering a plurality of second electric wires with one urethane-based resin inner sheath to be in contact with the plurality of first electric wires; and
a jacket covering an outer periphery of the plurality of first electric wires and the multicore wire,
wherein the plurality of first electric wires are extended out of an end portion of the jacket,
wherein the multicore wire is extended out of the end portion of the jacket and an end portion of the multicore wire that is extended out of the end portion of the jacket is resin molded,
wherein the plurality of first electric wires and the multicore wire are twisted together, and
wherein an arithmetic mean surface roughness Ra of an entire outer surface of the inner sheath, at least at a portion in contact with the plurality of first electric wires and the end portion of the multicore wire which is to be covered with the resin mold, is not less than 1 μm and not more than 30 μm.

18. The composite cable according to claim 17, wherein the arithmetic mean surface roughness Ra of the outer surface of the inner sheath is not less than 1 μm and not more than 15 μm.

19. The composite cable according to claim 18, wherein the arithmetic mean surface roughness Ra of the outer surface of the inner sheath is not less than 4 μm and not more than 15 μm.

* * * * *